US011080631B2

(12) United States Patent
Verosub et al.

(10) Patent No.: US 11,080,631 B2
(45) Date of Patent: Aug. 3, 2021

(54) ENRICHING TRANSIT DATA AND TRANSIT DATA PROCESSING

(71) Applicant: Apple Inc., Cupertino, CA (US)

(72) Inventors: Ellis M. Verosub, San Carlos, CA (US); Frank Fejes, Los Altos, CA (US); Arun Muralidharan, Valencia, CA (US)

(73) Assignee: Apple Inc., Cupertino, CA (US)

( * ) Notice: Subject to any disclaimer, the term of this patent is extended or adjusted under 35 U.S.C. 154(b) by 739 days.

(21) Appl. No.: 14/869,893

(22) Filed: Sep. 29, 2015

(65) Prior Publication Data

US 2016/0358112 A1 Dec. 8, 2016

Related U.S. Application Data

(60) Provisional application No. 62/172,008, filed on Jun. 5, 2015.

(51) Int. Cl.
*G06Q 10/00* (2012.01)
*G06Q 10/06* (2012.01)
*G08G 1/123* (2006.01)
*G01C 21/34* (2006.01)
*G01C 21/32* (2006.01)
*G01C 21/00* (2006.01)
*G01C 21/36* (2006.01)

(52) U.S. Cl.
CPC ....... *G06Q 10/06314* (2013.01); *G01C 21/00* (2013.01); *G01C 21/32* (2013.01); *G01C 21/34* (2013.01); *G01C 21/343* (2013.01); *G01C 21/36* (2013.01); *G08G 1/123* (2013.01)

(58) Field of Classification Search
CPC .. G06Q 10/06314; G01C 21/32; G01C 21/34; G01C 21/36
USPC ........................................................ 705/7.24
See application file for complete search history.

(56) References Cited

U.S. PATENT DOCUMENTS

| 5,412,573 | A  | * | 5/1995  | Barnea ................. G01C 21/367 340/990 |
| 7,469,827 | B2 | * | 12/2008 | Katragadda ............ G08G 1/123 235/375 |
| 7,925,427 | B2 | * | 4/2011  | Zehler .................... G01C 21/26 701/425 |
| 7,957,871 | B1 | * | 6/2011  | Echeruo ............. G01C 21/3626 104/27 |
| 8,315,801 | B2 |   | 11/2012 | Takagi |

(Continued)

OTHER PUBLICATIONS

Choi et al. "Transportation Research Part C: Emerging Technologies" "Development of a transit network from a street map database with spatial analysis and dynamic segmentation" vol. 8, Issues 1-6, Feb.-Dec. 2000, pp. 129-146 (Year: 2000).*

(Continued)

*Primary Examiner* — Hafiz A Kassim
*Assistant Examiner* — Tyrone E Singletary
(74) *Attorney, Agent, or Firm* — Invoke (57) ABSTRACT

Some embodiments of the invention provide a method that receives structured curated data regarding transit infrastructure and receives scheduled transit data regarding transit trips provided by a transit operation. The method also aligns scheduled transit data with structured curated data in order to allow the transit data to be associated with a set of attributes of the structured curated data.

22 Claims, 7 Drawing Sheets

(56) References Cited

U.S. PATENT DOCUMENTS

| | | | |
|---|---|---|---|
| 8,700,328 B1 * | 4/2014 | Raychev | G01C 21/3423 701/413 |
| 8,738,284 B1 * | 5/2014 | Jones | G01C 21/3673 701/409 |
| 8,855,921 B2 * | 10/2014 | Modica | G06T 11/203 701/410 |
| 2001/0049581 A1 * | 12/2001 | Kane | G08G 1/123 701/410 |
| 2002/0069017 A1 * | 6/2002 | Schmier | G08G 1/123 701/469 |
| 2004/0158395 A1 * | 8/2004 | Yamada | G01C 21/20 701/533 |
| 2008/0027772 A1 * | 1/2008 | Gernega | G06Q 10/04 705/7.26 |
| 2008/0068221 A1 | 3/2008 | Park | |
| 2008/0195428 A1 * | 8/2008 | O'Sullivan | G06Q 10/063112 705/6 |
| 2010/0115030 A1 | 5/2010 | Hong et al. | |
| 2010/0253549 A1 * | 10/2010 | Kim | G08G 1/123 340/994 |
| 2011/0112759 A1 * | 5/2011 | Bast | G01C 21/34 701/533 |
| 2012/0053830 A1 * | 3/2012 | Bach | G01C 21/20 701/438 |
| 2013/0030683 A1 * | 1/2013 | Morad | G08G 1/20 701/300 |
| 2013/0158846 A1 * | 6/2013 | Zhang | G08G 1/123 701/117 |
| 2013/0344802 A1 * | 12/2013 | Armour | H04W 84/005 455/39 |
| 2014/0046827 A1 * | 2/2014 | Hochstatter | G06Q 40/02 705/38 |
| 2014/0129135 A1 * | 5/2014 | Holden | G01C 21/30 701/420 |
| 2014/0324748 A1 * | 10/2014 | Modica | G08G 1/123 706/20 |
| 2014/0372904 A1 | 12/2014 | Liu et al. | |
| 2015/0046083 A1 * | 2/2015 | Maitra | G08G 1/123 701/465 |
| 2015/0168149 A1 * | 6/2015 | Graells | G01C 21/26 701/527 |
| 2015/0262399 A1 | 9/2015 | Popescu | |
| 2015/0345973 A1 * | 12/2015 | Flier | G01C 21/36 701/400 |

OTHER PUBLICATIONS

Gontmahker, Sasha, "Know When Your Bus is Late with Live Transit Updates in Google Maps", Official Google Blog, Published Jun. 8, 2011, 11 pages, https://googleblog.blogspot.com/2011/06/know-when-your-bus-is-late-with-live.html.

Author Unknown, "Transit-BEST Bus & Rail App! How to Navigate Major Cities" MrApp4That, Sep. 24, 2014, available at https://www.youtube.com/watch?v=lEjo_PWWOAQ, YouTube, USA.

* cited by examiner

ENRICHING TRANSIT DATA AND TRANSIT DATA PROCESSING

BACKGROUND

Today, many transit operators produce GTFS (General Transit Feed Specification) feeds to output data regarding their transit operations. This data includes data regarding transit stops, routes, and trips. This data often has inaccuracies in terms of transit stop locations and is at times incomplete. Thus, transit navigation applications that use this data often produce inaccurate or incomplete transit route analysis and/or instructions.

SUMMARY

Some embodiments of the invention provide a method that augments transit data for processing. In some embodiments, transit data is data that describes transit trips that are taken by transit vehicles in a locality. The method receives curated infrastructure data regarding the physical transit infrastructure. In some embodiments, the curated infrastructure data includes highly accurate data regarding the lines traversed by the transit vehicles, the platforms (i.e., stop locations) for the lines, and other transit infrastructure data. In some embodiments, this data is referred to as "ground-truth" data because, in these embodiments, this data is captured by a curating team that manually captures the data by analyzing maps and/or going into the field.

In addition to the curated infrastructure data, the method also receives transit-scheduled data that includes routes, stops along the routes, and trips along the routes for one or more transit operators. In some embodiments, the transit-scheduled data is in a GTFS (General Transit Feed Specification) format. The method aligns the scheduled data with the curated infrastructure data. For instance, the method aligns routes and stops in the schedule data with the lines and platforms in the infrastructure data. After aligning the two data sets, the method allows scheduled transit data tuples to be associated with some or all of the attributes of their corresponding curated infrastructure data tuples. This association provides a much richer transit data processing as it allows the transit data tuples to be returned for a query along with associated curated data tuples that provides more information to a user and/or provides more data dimensions for processing the returned transit data tuples. The additional dimensions also enrich the querying as they provide more dimensions for specifying a query.

In some embodiments, the method performs one or more data cleansing and normalization operations on the received transit-scheduled data to correct errors in this data set and to normalize the format of this data to a common format. Also, to align the scheduled and structured data, the method in some embodiments first aligns the routes and lines, and then performs a stop-claiming operation to associate stops along each route to platforms along the lines. This is because the transit data often specifies one stop for multiple directions of travel at a route stop, whereas the curated infrastructure data often can have different platforms for different travel directions at a location.

To perform the stop-claiming, the method identifies several trip patterns from the transit trip data. Each trip pattern is a sequential order of stops that one or more trips take. For each trip pattern that is associated with a line (e.g., through the trip patterns association with a route that is associated with the line), the method duplicates the stops (i.e., creates trip-pattern stops) at transit data stops traveled by the trip pattern's trip(s) and creates an association between the duplicated stops and platforms in the structured data.

In some embodiments, the method does not use the cleansed, aligned transit data to process transit queries. Rather, the method (1) creates a searchable data storage by merging the curated infrastructure data with portion of the cleansed, aligned transit data, and then (2) provides this data storage as the data storage for processing queries. In some embodiments, the searchable data storage has a smaller subset of the transit data in order to have a smaller size. For instance, in some embodiments, the transit route and stop data tuples are not exported to this data storage. In place of these data tuples, the method just exports the line and platform tuples, and associates the transit trips to these tuples.

One of ordinary skill will realize that the preceding Summary is intended to serve as a brief introduction to some inventive features of some embodiments. Moreover, this Summary is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method that augments transit data for processing. In some embodiments, transit data is data that describes transit trips that are taken by transit vehicles in a locality. The method receives curated infrastructure data regarding the physical transit infrastructure. In some embodiments, the curated infrastructure data includes highly accurate data regarding the lines traversed by the transit vehicles, the platforms (i.e., stop locations) for the lines, and other transit infrastructure data. In some embodiments, this data is referred to as "ground-truth" data because, in these embodiments, this data is captured by a curating team that manually captures the data by analyzing maps and/or going into the field.

In addition to the curated infrastructure data, the method also receives transit-scheduled data that includes routes, stops along the routes, and trips along the routes for one or more transit operators. In some embodiments, the transit-scheduled data is in a GTFS (General Transit Feed Specification) format. The method aligns the scheduled data with the curated infrastructure data. For instance, the method aligns routes and stops in the schedule data with the lines and platforms in the curated infrastructure data. After aligning the two data sets, the method allows transit scheduled data tuples to be associated with some or all of the attributes of their corresponding curated infrastructure data tuples. This association provides much richer transit data processing as it allows the transit data tuples to be returned for transit queries along with associated curated data that provides more information to a user and/or provides more data dimensions for processing the returned transit data tuples. The additional dimensions also enrich the querying as they provide more dimensions for specifying a query.

Figure 1:
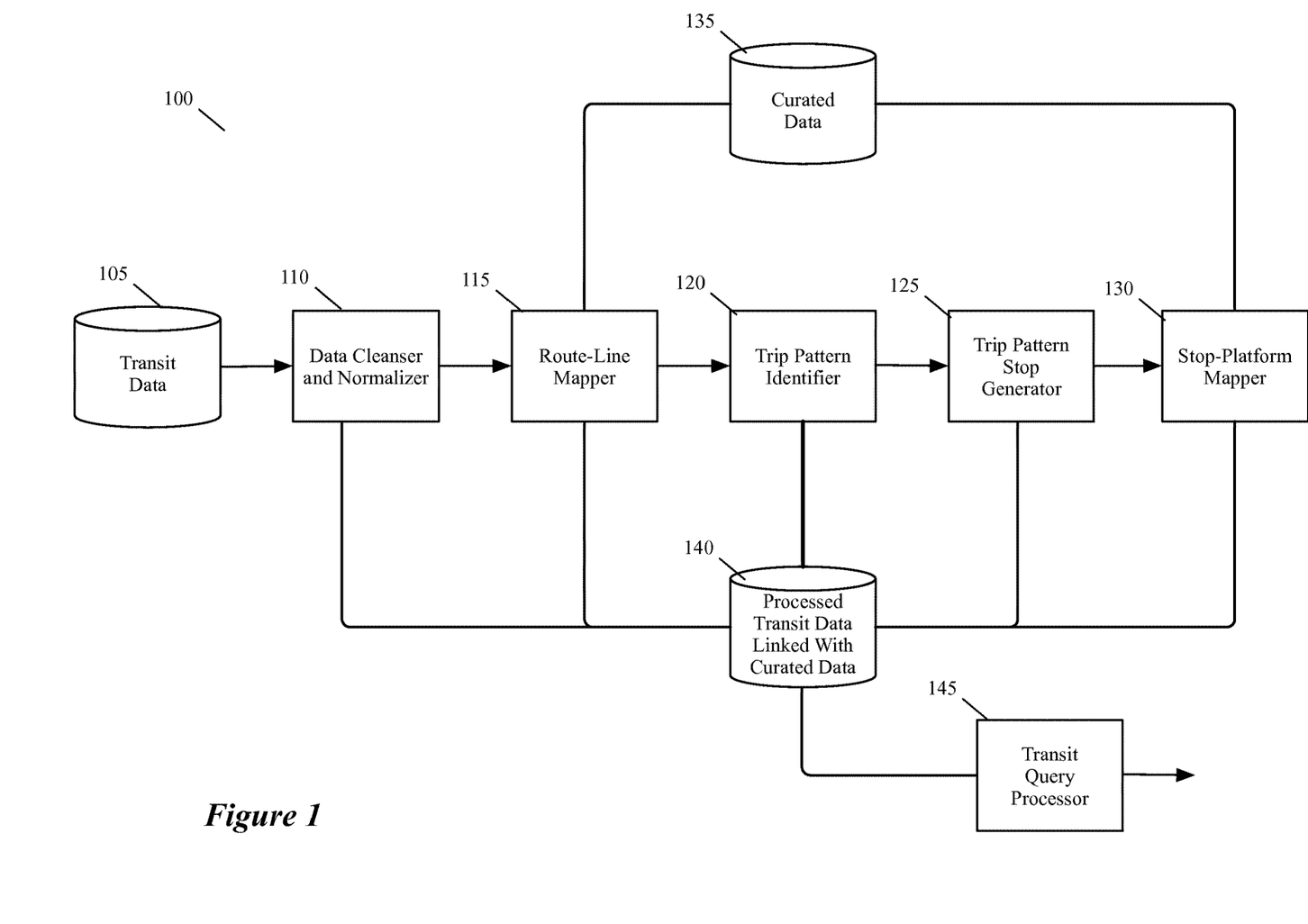
FIG. 1 conceptually illustrates an example of a transit-data processing system that implements a transit-data augmenting method of some embodiments FIG. 2 conceptually illustrates another example of a transit-data processing system of some embodiments FIG. 3 conceptually illustrates a process of a transit processing system of some embodiments.

FIG. 1 conceptually illustrates a transit-data processing system 100 that implements the transit-data augmenting method of some embodiments. As shown, this system includes a data cleanser/normalizer 110, a route-line mapper 115, a trip pattern identifier 120, a stop generator 125, a stop-platform mapper 130, and a transit query processor 145. Each of these modules can be a standalone computer. Alternatively, one computer can implement multiple modules of the transit-data processing system 100.

As shown, the system 100 also includes transit data storage 105, curated data storage 135, and processed transit data storage 140. The transit data storage 105 stores transit scheduled data from one or more different transit operators. This data is occasionally updated as the transit operators and/or their vendors release updated transit schedule data. The transit data is in a GTFS format in some embodiments. In some embodiments, the transit data includes route data, stop data, trip data, and calendar data. A trip in some embodiments includes a set of stops and dates (times and days) for the stops. The trip data in some embodiments also includes other data, such as whether the stop is a pick up location, a drop off location, etc. Also, different sets of trips can run during different periods. Hence, the calendar data is used in some embodiments to specify the trips that are active during different periods.

The curated data storage 135 stores the curated transit infrastructure data that is gathered by a curating team that analyzes maps and/or goes into the field. In some embodiments, the curated data includes data for lines, platforms, links, hallways, stations, station access points (e.g., doors, etc.), parking for the access points. In some embodiments, each platform has a location that is the ground-truth location where transit passengers stop while waiting for a transit vehicle. For instance, in a subway hall that houses on one or more tracks, two platforms are typically positioned on each side of the track(s), although in some locations (like Chicago) island platforms exist in between two different tracks. Hence, in some embodiments, platforms can be associated with just one direction (e.g., a southbound direction, a northbound direction, etc.) or more than one direction.

Links represent connections between platforms. In some embodiments, a link is defined in terms of a from-platform ID and a to-platform ID. Also, in some embodiments, a link has a geometric shape associated with it and this shape expresses the actual path of the transit network between the two platforms connected by the link. Hallways, stations, station access points and parking data are other curated data for the physical infrastructure, and all of this data along with the platform and link data is used in some embodiments to enrich the transit data, as further described below.

The data cleanser/normalizer 110 retrieves the transit data (e.g., data for one transit operator in one locality) from the transit data storage 105, and performs data cleansing and normalization operations on the received transit-scheduled data to correct errors in this data set and to normalize the format of this data to a common format. One set of cleansing operations deletes routes that are not useful for the public, such as maintenance routes, test routes, routes to non-public stops, etc. Another set of cleansing operations splits two routes that are referred as one route in the GTFS (e.g., because they overlap, because of poor naming conventions, because of historical/administrative reasons, etc.) into two different routes. Yet another operation fixes the route names (e.g., makes sure all route names have a first letter capitalized). In some embodiments, the route cleansing/normalization creates in the processed transit data storage 140 one route for each route that is not discarded as a result of the route cleansing operation.

In some embodiments, the data cleansing operation also cleans stops in the transit data. For instance, in some embodiment, this operation deletes non-public stops. Conjunctively, or alternatively, this operation in some embodiments also moves stops that have known bad locations (e.g., based on processing of previous GTFS feeds from the same transit operator). In some embodiments, the stop normalization is done after the route-line mapping. The cleansed and normalized transit data is stored in the processed transit data storage 140, as described above.

To align the scheduled and structured data, the route-line mapper 115 aligns the routes in the processed transit data storage 140 with the curated lines in the curated data storage 135. Multiple routes can be associated with the same line, but multiple lines cannot map to one route. In some embodiments, the route-line mapper 115 tries to automatically associate lines and routes based on naming convention and prior mapping of lines and routes. In these embodiments, the route-line mapper presents the route-line data superimposed on a map that is presented in a user interface (UI) so that one or more professionals can associate the lines and routes that cannot be automatically associated. In some embodiments, the line-route association is only done manually through the UI. In some embodiments, the result of the route-line mapping is a table of joins, with each join specifying an association between a route and a line.

After the routes-lines are aligned, the trip pattern (TP) identifier 120 specifies several trip patterns from the transit trip data in the processed transit data storage 140. Each trip pattern is a sequential order of stops that one or more trips take. To identify the trip patterns, the TP identifier iterates through all the trips, identifies ordered list of stops for each trip, and discards duplicate lists of stops. The lists of stops that remain after the de-duplication (i.e., after the duplicates are discarded) are the trip patterns. The TP identifier 120 then associates each trip to an identified trip pattern (e.g., through a TP_ID).

In some embodiments, the TP identifier also associates each trip pattern with a line. To associate the trip patterns with lines, the TP identifier 120 iteratively selects each route that is associated with a line. For each such route, the TP identifier examines all the trips and identifies the corresponding trip pattern for the trips. The TP identifier then associates each identified trip pattern (i.e., each trip pattern that is associated with an examined trip of a selected route) to the selected route's line. The TP identifier 120 stores the association between the trip patterns and the lines in the processed transit data storage 140.

After the trip patterns are associated with lines, the TP stop generator 125 creates a stop (called trip-pattern stop below) at the location of each stop of a trip pattern and associates these new stops with the trip pattern. Before this operation, multiple trip patterns might have been associated with the same stop. This operation is performed so that each trip pattern has its own unique stop as this will simplify a subsequent stop-mapping operation to associate a trip stop to a platform. More specifically, transit data often specifies one stop for multiple directions of travel at a route stop, whereas the curated structure data often can have different platforms for different travel directions at a location. Thus, to assist with the association between each trip's stop and a platform, the stop generator creates a unique trip pattern stop for each transit stop used by a trip pattern.

Once unique stops are created for the identified trip patterns and the trip patterns are redefined to reference these newly created stops, the stop-platform mapper 130 creates an association between each TP stop and a platform. To associate each TP stop with a platform, the stop-platform mapper 130 performs a stop-claiming operation, which will be further described below by reference to FIGS. 4 and 5.

In some embodiments, the result of the stop-claiming operation is another table of joins, with each join associating one trip-pattern stop to one platform. The stop-platform mapper 130 stores these joins in the processed transit data storage 140 in some embodiments. Through the defined joins, the transit data tuples can be associated with attributes of the curated data tuples. Specifically, once the joins are defined between the transit scheduled data and the curated infrastructure data, the transit query process 145 allows the transit data in the processed transit data storage 140 to be queried not only queried in terms of the processed transit data but also in terms of one or more data dimensions provided by the curated data. Also, the curated data can be used to process the transit data.

For instance, transit navigation applications typically do not provide much guidance about the access doors of stations that lead to the desired transit platform. Also, they do not typically provide much guidance to the transit hallways and/or transit platforms as they only use coarse GTFS stops that are defined in the transit data feed. However, in the system 100, the curated infrastructure data includes access doors, hallways, and platforms and the stops and trips in the processed data storage 140 are associated with these curated lines and platforms. Through the association between the trip-pattern stops and platforms and through the association between the platforms and other curated constructs (such as access door, hallway, etc.), the transit query processor 145 allow a transit application to query for the nearest station access door to take to enter a station from a device's current location and to identify a route from this door to the desired platform for a particular trip. Through these associations and the query results, the navigation application can also identify the parking lots to use.

Figure 2:
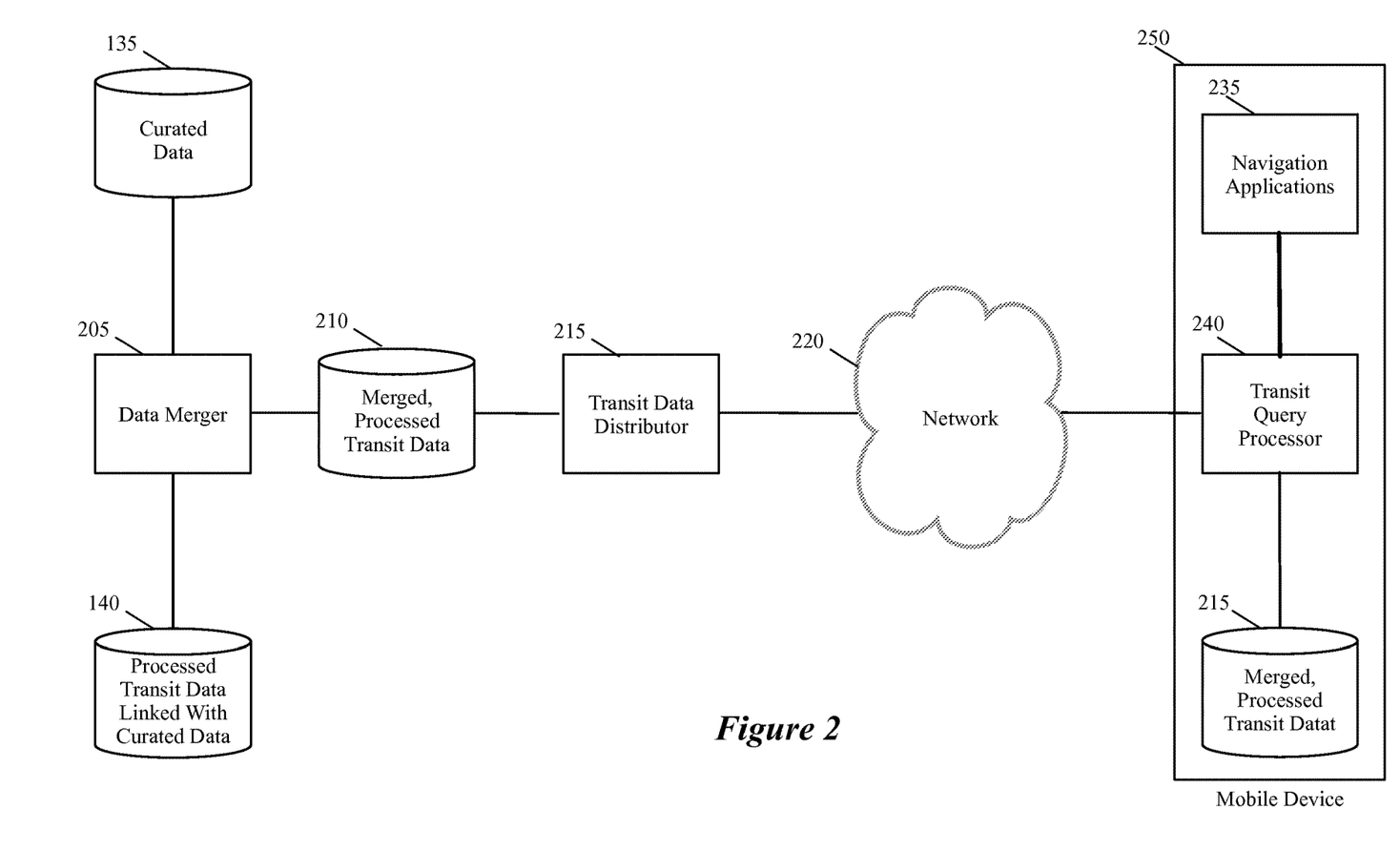

The transit data processing system of some embodiments does not use the processed transit data storage 140 to process queries for transit data. Rather, the system (1) creates a searchable data storage by merging the structured data with a portion of the processed transit data, and then (2) provides this data storage as the data storage for processing queries. FIG. 2 illustrates an example of one such approach. Specifically, it illustrates a data merger 205 that exports the curated infrastructure data from the curated data storage 135 and a portion of the processed scheduled transit data from the processed transit data storage 140, to a merged data storage 210. In some embodiments, the searchable data storage has a smaller subset of the transit data in order to have a smaller size. For instance, in some embodiments, the route, stop and trip pattern tuples are not exported to the merged data storage 210. In place of these data tuples, the data merger just exports the processed transit trips along with the curated line and platform tuples. As part of this export operation, the data merger 205 directly associates each processed trip with the platforms that are associated with the trip-pattern stops in the processed data storage 140.

After generating the merged data storage 210, a distribution module 215 sends through a network 220 (e.g., the Internet and/or wireless cellular network) this data storage to many mobile devices, one of which is shown in FIG. 2. As shown, the mobile device 250 executes a navigation application 235 that provides transit navigation browsing and presentations. This navigation application interfaces with a transit data query processor 240 to pull transit data from the merged data storage 210. In some embodiments, the transit data query processor 240 is part of the navigation application 235.

In the merged data storage 210, the transit trips are associated with curated platforms. Through this association, the queried transit trip data can be searched based on the curated data tuples. The queried transit data can also be returned with associated curated data tuples that can assist in the processing or display of the transit data. One of ordinary skill will realize that other embodiments might distribute the aligned scheduled transit data and curated infrastructure data differently. For instance, some embodiments do not merge these data sets together, but rather distribute these data sets, or portions of them, in their own separate data storages (e.g., in their own databases).

Figure 3:
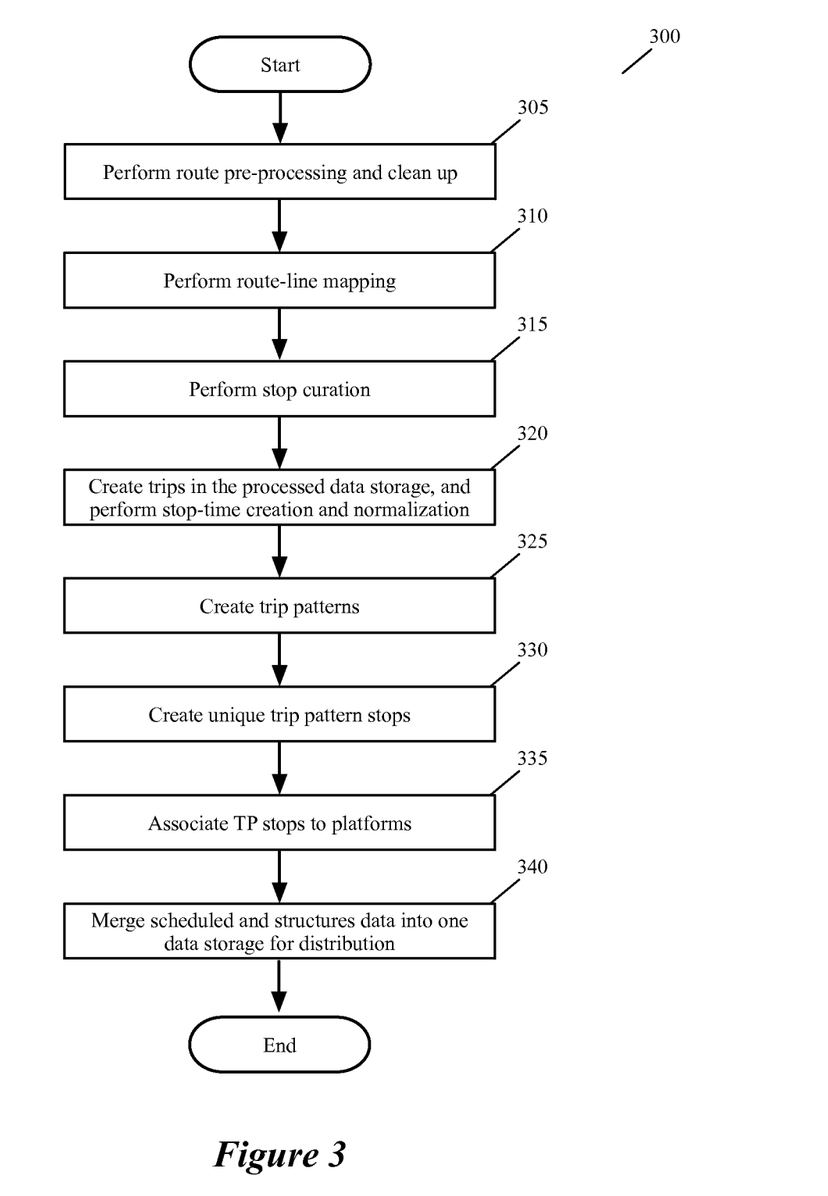

FIG. 3 illustrates a process 300 that the transit processing system of some embodiments performs to align scheduled transit data with curated infrastructure data, and to export this data to a merged data storage 210. The process 300 initially performs (at 305) route pre-processing and clean up. To do this, the process retrieves the route data from the transit data storage 105, and performs data cleansing and normalization operations on the route data to correct errors in this data set and to normalize the format of this data to a common format. One set of cleansing operations deletes routes that are not useful for the public, such as maintenance routes, test routes, routes to non-public stops. Another set of cleansing operations splits two routes that are referred as one route in the GTFS (e.g., because they overlap, because of poor naming conventions, because of historical/administrative reasons, etc.) into two different routes. Yet another operation fixes the route names (e.g., makes sure all route names have a first letter capitalized). In some embodiments, the route cleansing/normalization creates in the processed transit data storage 140 one route for each route that is not discarded as a result of the route cleansing operation.

Next, at 310, the process 300 aligns the routes in the processed transit data storage 140 with the curated lines in the curated data storage 135. This is one of the operations that the process 300 performs to align the scheduled and structured data. Multiple routes can be associated with the same line, but multiple lines cannot map to one line. In some embodiments, the process 300 tries to automatically associate lines and routes based on naming convention and prior mapping of lines and routes. In these embodiments, the process 300 presents the route-line data superimposed on a map that is presented in a user interface (UI) so that one or more professionals can associate the lines and routes that cannot be automatically associated. In some embodiments, the line-route association is only done manually through the UI. In some embodiments, the result of the route-line mapping is a table of joins, with each join specifying an association between a route and a line.

After 310, the process 300 performs (at 315) stop curating, which is a data cleansing operations on the stop data in the transit data storage 105. In some embodiments, this operation deletes non-public stops. Conjunctively, or alternatively, this operation in some embodiments also moves stops that have known bad locations (e.g., based on processing of previous GTFS feeds from the same transit operator) and fixes known issues with stop names. The cleansed stop data is stored in the processed transit data storage 140.

Next, at 320, the process creates the transit trips in the processed data storage 140. In some embodiments, the process retrieves each GTFS trip in the transit data storage 105, creates a new trip in the data storage 140, and performs stop-time creation and normalization for this new trip. The stop-time creation/normalization operation normalizes the format of the stop times to a commonly used format. In some embodiments, the process also converts the stop times from a GTFS string format to a data format that is defined to simplify mathematical calculations and other data processing. At 320, the process also creates stop times for stops that have missing times. In some embodiments, the process performs this operation through an interpolation calculation that interpolates an intervening stop's time by reference to the times of the nearby stops. The process 300 stores the results of its operation (at 320) in the processed transit data storage 140.

After cleansing/normalization and the route-line alignment, the process creates (at 325) several trip patterns from the transit trip data in the processed transit data storage 140. Each trip pattern is a sequential order of stops that one or more trips take. To identify the trip patterns, the process 300 iterates through all the trips, identifies ordered list of stops for each trip, and discards duplicate lists of stops. The lists of stops that remain after the de-duplication (i.e., after the duplicates are discarded) are the trip patterns. The process associates each trip to an identified trip pattern (e.g., through a TP_ID).

In some embodiments, the process 300 also associates (at 325) each trip pattern with a line. To associate the trip patterns with lines, the process iteratively selects each route that is associated with a line. For each such route, the process examines all the trips and identifies the corresponding trip pattern for the trips. The process then associates each identified trip pattern (i.e., each trip pattern that is associated with an examined trip of a selected route) to the selected route's line. The process 300 stores the association between the trip patterns and the lines in the processed transit data storage 140.

After the trip patterns are associated with lines, the process 300 creates (at 330) a stop (called trip-pattern stop below) at the location of each stop of a trip pattern and associates these new stops with the trip pattern. Before this operation, multiple trip patterns might have been associated with the same stop. This operation is performed so that each trip pattern has its own unique stop as this will simplify a subsequent stop-mapping operation to associate a trip stop to a platform.

Once unique stops are created for the identified trip patterns and the trip patterns are redefined to reference these newly created stops, the process 300 creates (at 335) an association between each TP stop and a platform. To associate each TP stop with a platform, the process 300 performs a stop-claiming operation, which will be further described below by reference to FIGS. 4 and 5.

In some embodiments, the result of the stop-claiming operation is another table of joins, with each join associating one trip-stop to one platform. The process 300 stores this joins in the processed transit data storage 140 in some embodiments. Through the defined joins, the transit data tuples can be associated with attributes of the curated data tuples, as described above.

After 335, the process 300 creates (at 340) the merged data storage 210 by merging the structured data with a portion of the processed transit data. The process provides this searchable data storage as the data storage for processing queries. In some embodiments, the searchable data storage has a smaller subset of the transit data in order to have a smaller size. For instance, in some embodiments, the process 300 does not export (at 340) the route, stop and trip pattern tuples to the merged data storage 210. In place of these data tuples, the data merger just exports the processed transit trips along with the curated line and platform tuples. As part of this export operation, the process 300 directly associates each processed trip with the platforms that are associated with the trip's stops (through the trip stop's association with its trip pattern, which is associated with the line) in the processed data storage 140.

As described above, the process 300 performs (at 335) the stop-claiming operation to associate the transit stops to the station platforms. Stop-claiming uses the connectivity graphs of the lines. Each trip pattern is associated with a line through a line ID that was assigned to the trip pattern at 325. For each line, the stop claimer retrieves the line's links. A link is a single platform-to-platform connection with an associated shape. Once all the links for a line has been retrieved the stop claimer has effectively identified all the platforms for the line (through their connections to the retrieved link) and has a graph of the platforms connect together (either directly or indirectly).

For each trip pattern, the stop claimer iterates through the trip-pattern stops (i.e., the stops that were specifically defined for the trip pattern at 325) and groups each stop together with all the platforms that are "nearby." In some embodiments, the nearby assessment is based on a configurable distance (e.g., 750m).

Figure 4:
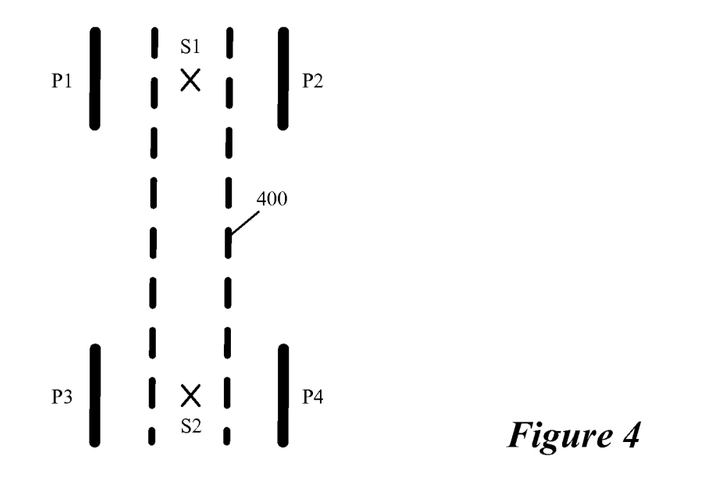
FIG. 4 illustrates an example of a simple trip pattern with two stops.

After grouping each stop with the nearby platforms, the stop claimer steps through the trip pattern and tries to make unambiguous "best" connections between the trip stops and the nearby platforms. To illustrate this, FIG. 4 presents a simple trip pattern with two stops. In this example, the line has northbound and southbound platforms on each side of the track. Hence, at two stops S2 and S2, there are four platforms P1-P4 as shown.

The trip pattern includes stops S1 and S2 in that order. The nearby platforms for stop S1 are platforms P1 and P2, while the nearby platforms for stop S2 are platforms P3 and P4. Also, on the line 400, there are two links, one that goes from P1 to P3, and another that goes from P4 to P2. For this trip pattern, the stop claimer attempts to make every connection it can between S1's platforms to S2's platforms. These possible connections are: P1 to P3, P1 to P4, P2 to P3 and P2 to P4. Of these, the only one that has a link (P1 to P3) is P1, which means that stop S1 can only be associated with platform P1 and the stop S2 can only be associated with platform P3. Through this association, every trip that follows that trip pattern starts at P1 and ends at P3.

Figure 5:
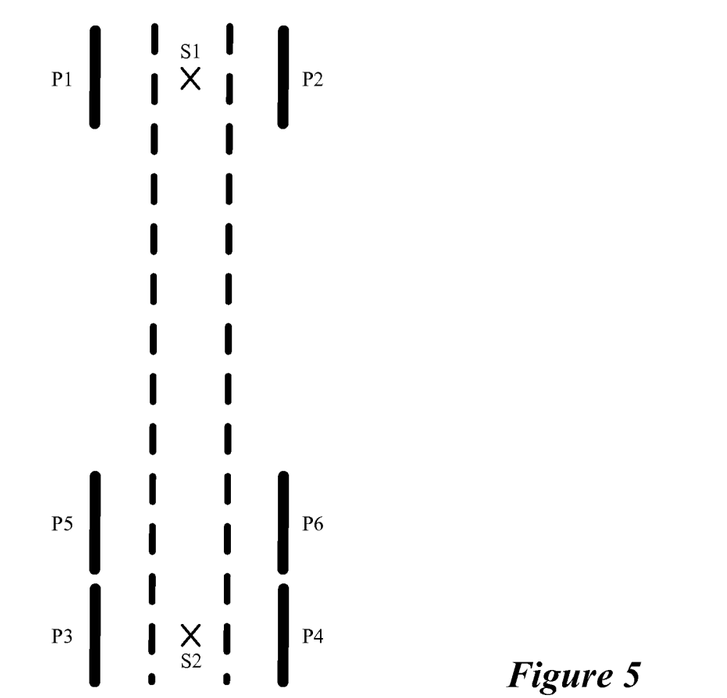
FIG. 5 illustrates a more complex example of a trip pattern with two stops.

FIG. 5 illustrates a more complex example with multiple possibilities, which requires some filtering. This example is similar to the example of FIG. 4, except that in FIG. 5 two additional platforms P5 and P6 are near platforms P3 and P4 and there are now four links between P1 and P5, P5 and P3, P2 and P6, and P6 and P4. This happens because some transit operators (e.g., light rails, trams, buses, etc.) have local stops relatively close to each other. As stop-claiming radius increases, the stop-claiming process might end up catching more platforms in each stop's circle. The stop-claiming process uses large circles in some embodiments because some transit operators might specify their stops very inaccurately and larger circles are needed to capture the actual platform location.

Because of this proximity, the stop S2 geospatially matches platforms P3-P6 and there is connectivity from P1 to P5 and P1 to P3 (through the P1 to P5 connection). Hence, the stop claimer has to make a decision and select the "best" pair. To do this, the stop claimer computes a score in some embodiments based on the following equation:

Score=[Distance between *PA* to *PB* ]+[(Distance between *SA* to *PA*)*Weight *X*]+[(Distance between *SB* to *PB*)*Weight *Y*]+Edge_Number, where PA and PB are the from and to platforms, SA and SB are the from and to stops, and Edge_Number is the number of direct connections required to get from platform PA to PB.

The stop claimer then sorts the scores for all the connected pairs and chooses the one with the lowest score. For the example illustrated in FIG. 4, assume that that the distance from P1 to P5 is 1000 meters and the distance from P5 to P3 is 100 meters. Also, assume that the distance between S1 and P1 and S2 and P3 are each 5 meters, while the distance between S2 and P5 is 105 meters. With these numbers, the score for the P1 to P5 and P1 to P3 links are computed as follows:

Score(*P*1 to *P*5)=1000+(5*2)+(105*2)+1=1221

Score(*P*1 to *P*3)=1100+(5*2)+(5*2)+2=1122

Thus, in this example, the connection from P1 to P3 has the best score and thus P3 is a better match for S2 than P5.

As part of selecting possible platform-to-platform connections, the stop claimer also filters out the platforms that cannot connect from the "to" platform to any of the geospatially matched platforms near the stop at the end of the TP. This helps select between ambiguous connections (where the score is exactly the same).

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
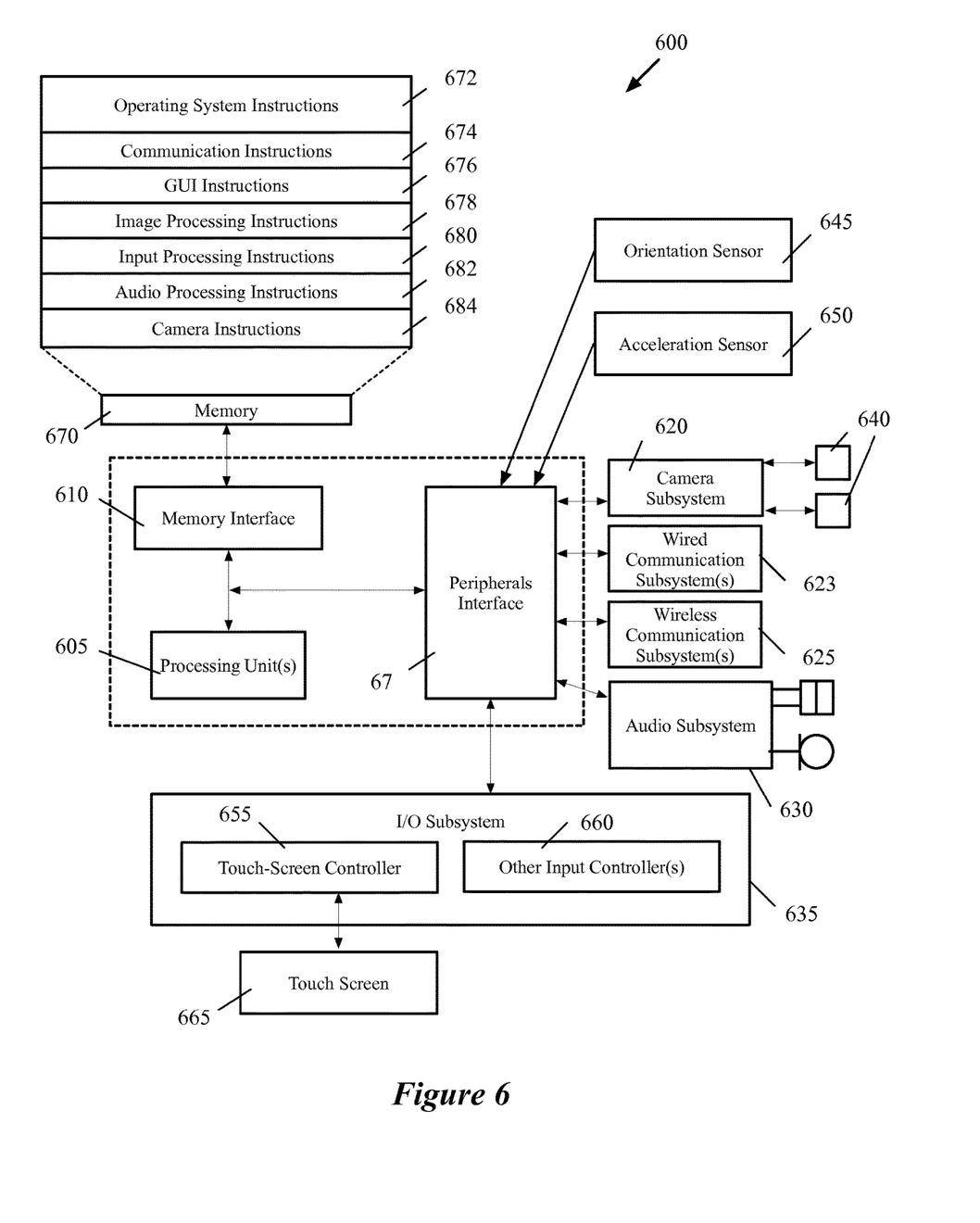
FIG. 6 is an example of an architecture of a mobile computing device of some embodiments.

The applications of some embodiments operate on mobile devices, such as smart phones (e.g., iPhones®) and tablets (e.g., iPads®). FIG. 6 is an example of an architecture 600 of such a mobile computing device. Examples of mobile computing devices include smartphones, tablets, laptops, etc. As shown, the mobile computing device 600 includes one or more processing units 605, a memory interface 610 and a peripherals interface 615.

The peripherals interface 615 is coupled to various sensors and subsystems, including a camera subsystem 620, a wireless communication subsystem(s) 625, an audio subsystem 630, an I/O subsystem 635, etc. The peripherals interface 615 enables communication between the processing units 605 and various peripherals. For example, an orientation sensor 645 (e.g., a gyroscope) and an acceleration sensor 650 (e.g., an accelerometer) is coupled to the peripherals interface 615 to facilitate orientation and acceleration functions.

The camera subsystem 620 is coupled to one or more optical sensors 640 (e.g., a charged coupled device (CCD) optical sensor, a complementary metal-oxide-semiconductor (CMOS) optical sensor, etc.). The camera subsystem 620 coupled with the optical sensors 640 facilitates camera functions, such as image and/or video data capturing. The wireless communication subsystem 625 serves to facilitate communication functions. In some embodiments, the wireless communication subsystem 625 includes radio frequency receivers and transmitters, and optical receivers and transmitters (not shown in FIG. 6). These receivers and transmitters of some embodiments are implemented to operate over one or more communication networks such as a GSM network, a Wi-Fi network, a Bluetooth network, etc. The audio subsystem 630 is coupled to a speaker to output audio (e.g., to output voice navigation instructions). Additionally, the audio subsystem 630 is coupled to a microphone to facilitate voice-enabled functions, such as voice recognition (e.g., for searching), digital recording, etc.

The I/O subsystem 635 involves the transfer between input/output peripheral devices, such as a display, a touch screen, etc., and the data bus of the processing units 605 through the peripherals interface 615. The I/O subsystem 635 includes a touch-screen controller 655 and other input controllers 660 to facilitate the transfer between input/output peripheral devices and the data bus of the processing units 605. As shown, the touch-screen controller 655 is coupled to a touch screen 665. The touch-screen controller 655 detects contact and movement on the touch screen 665 using any of multiple touch sensitivity technologies. The other input controllers 660 are coupled to other input/control devices, such as one or more buttons. Some embodiments include a near-touch sensitive screen and a corresponding controller that can detect near-touch interactions instead of or in addition to touch interactions.

The memory interface 610 is coupled to memory 670. In some embodiments, the memory 670 includes volatile memory (e.g., high-speed random access memory), non-volatile memory (e.g., flash memory), a combination of volatile and non-volatile memory, and/or any other type of memory. As illustrated in FIG. 6, the memory 670 stores an operating system (OS) 672. The OS 672 includes instructions for handling basic system services and for performing hardware dependent tasks.

The memory 670 also includes communication instructions 674 to facilitate communicating with one or more additional devices; graphical user interface instructions 676 to facilitate graphic user interface processing; image processing instructions 678 to facilitate image-related processing and functions; input processing instructions 680 to facilitate input-related (e.g., touch input) processes and functions; audio processing instructions 682 to facilitate audio-related processes and functions; and camera instructions 684 to facilitate camera-related processes and functions. The instructions described above are merely exemplary and the memory 670 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 6 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 6 may be split into two or more integrated circuits.

Figure 7:
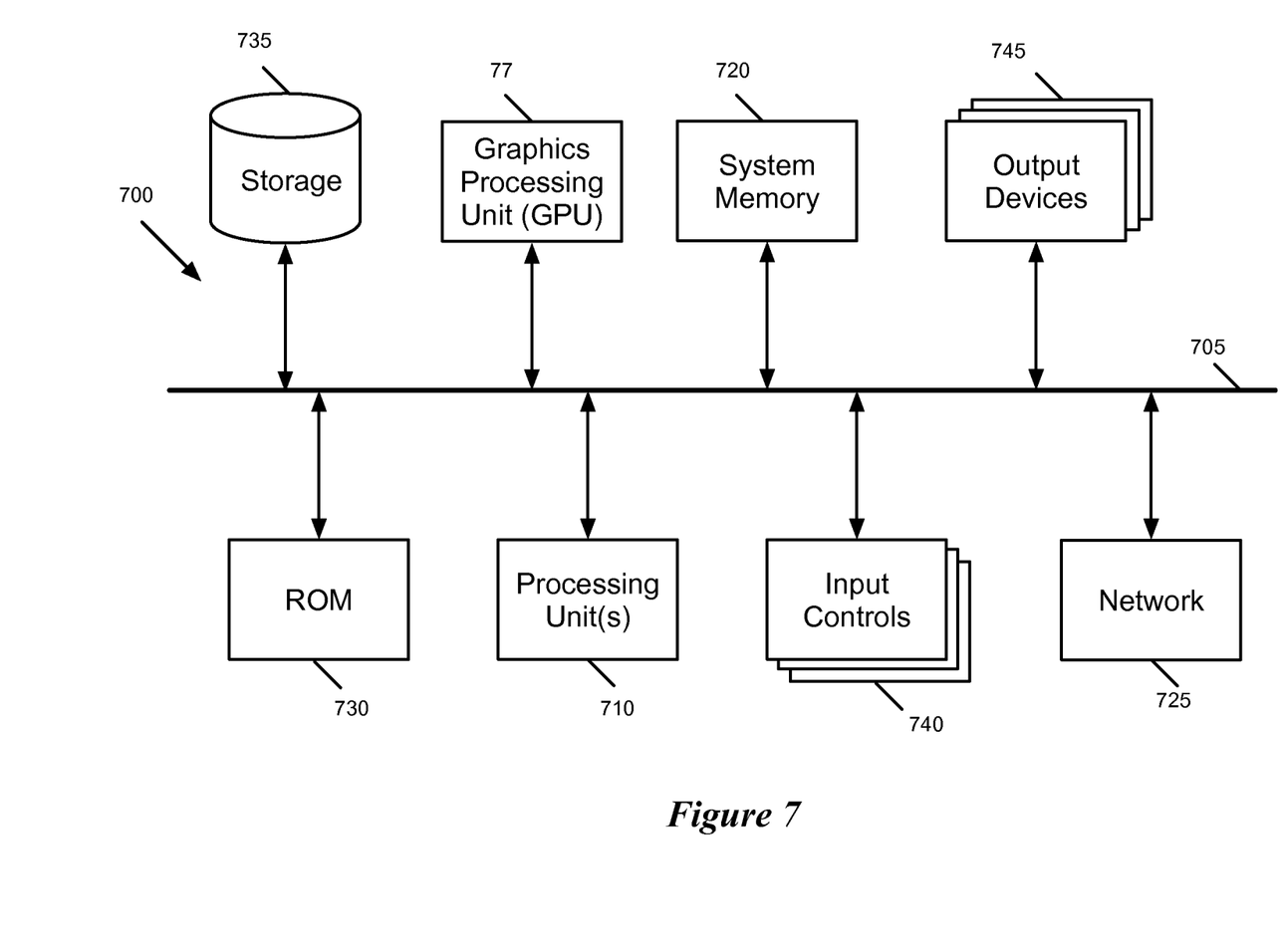
FIG. 7 conceptually illustrates an example of an electronic system with which some embodiment of the invention are implemented.

FIG. 7 conceptually illustrates another example of an electronic system 700 with which some embodiments of the invention are implemented. The electronic system 700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 700 includes a bus 705, processing unit(s) 710, a graphics processing unit (GPU) 715, a system memory 720, a network 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the GPU 715, the system memory 720, and the permanent storage device 735.

From these various memory units, the processing unit(s) 710 retrieves instructions to execute and data to process in order to execute the processes of the invention. The processing unit(s) may be a single processor or a multi-core processor in different embodiments. Some instructions are passed to and executed by the GPU 715. The GPU 715 can offload various computations or complement the image processing provided by the processing unit(s) 710.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive, integrated flash memory) as the permanent storage device 735.

Other embodiments use a removable storage device (such as a floppy disk, flash memory device, etc., and its corresponding drive) as the permanent storage device. Like the permanent storage device 735, the system memory 720 is a read-and-write memory device. However, unlike storage device 735, the system memory 720 is a volatile read-and-write memory, such a random access memory. The system memory 720 stores some of the instructions and data that the processor needs at runtime. In some embodiments, the invention's processes are stored in the system memory 720, the permanent storage device 735, and/or the read-only memory 730. For example, the various memory units include instructions for processing multimedia clips in accordance with some embodiments. From these various memory units, the processing unit(s) 710 retrieves instructions to execute and data to process in order to execute the processes of some embodiments.

The bus 705 also connects to the input and output devices 740 and 745. The input devices 740 enable the user to communicate information and select commands to the electronic system. The input devices 740 include alphanumeric keyboards and pointing devices (also called "cursor control devices"), cameras (e.g., webcams), microphones or similar devices for receiving voice commands, etc. The output devices 745 display images generated by the electronic system or otherwise output data. The output devices 745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 7, bus 705 also couples electronic system 700 to a network 725 through a network adapter (not shown). In this manner, the computer can be a part of a network of computers (such as a local area network ("LAN"), a wide area network ("WAN"), or an Intranet), or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 8:
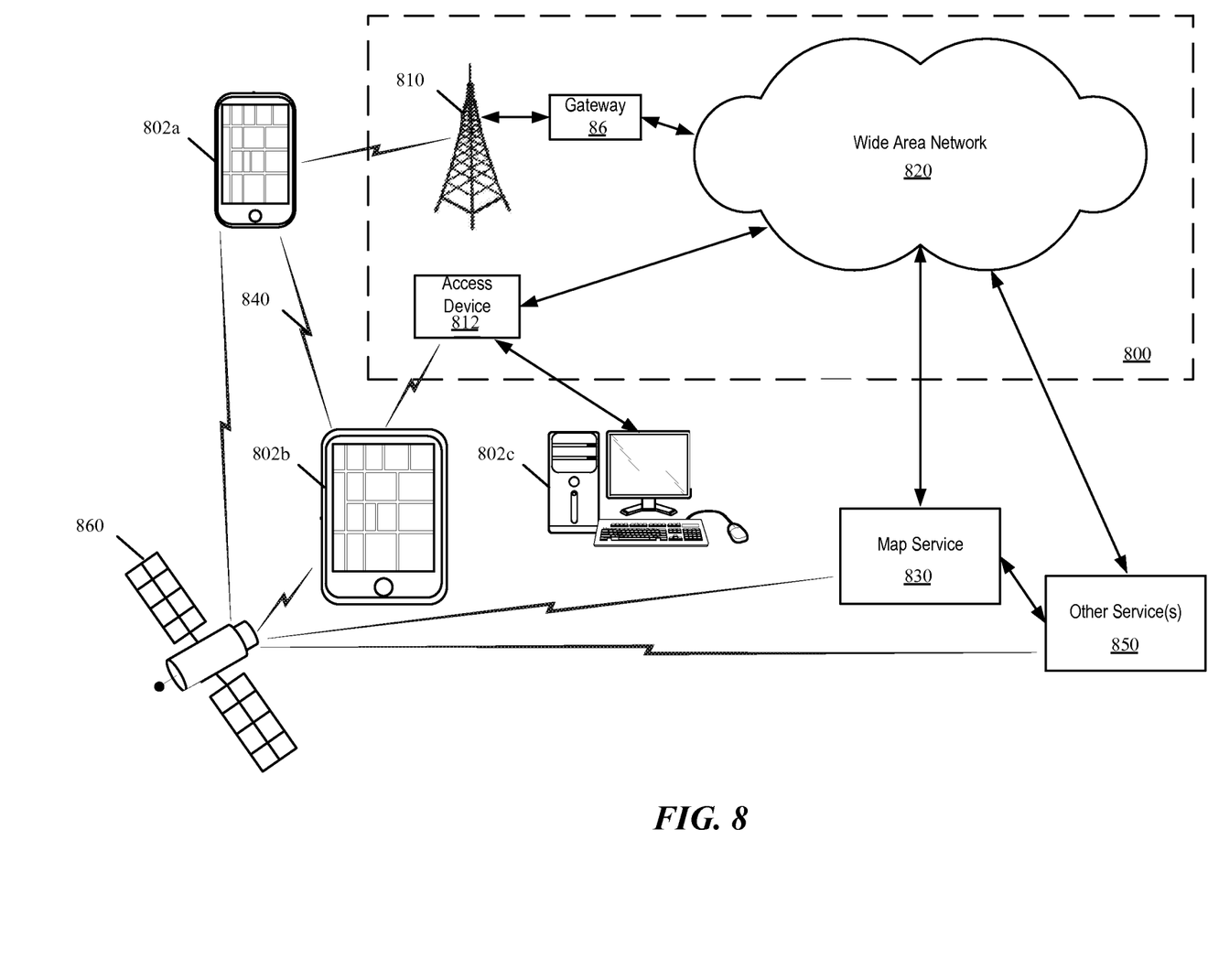
FIG. 8 illustrates a map service operating environment, according to some embodiments.

Various embodiments may operate within a map service operating environment. FIG. 8 illustrates one possible embodiment of an operating environment 800 for a map service (also referred to as a mapping service) 830 and client devices 802a-802c. In some embodiments, devices 802a, 802b, and 802c communicate over one or more wired or wireless networks 810. For example, wireless network 810, such as a cellular network, can communicate with a wide area network (WAN) 820, such as the Internet, by use of gateway 814. A gateway 814 in some embodiments provides a packet oriented mobile data service, such as General Packet Radio Service (GPRS), or other mobile data service allowing wireless networks to transmit data to other networks, such as wide area network 820. Likewise, access device 812 (e.g., IEEE 802.11g wireless access device) provides communication access to WAN 820.

The client devices 802a and 802b can be any portable electronic or computing device capable of communicating with a map service (e.g., smart phone, tablet, laptop computer, etc.). Device 802c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 802a-802c are not shown as each accessing the map service 830 via either the wireless network 810 and gateway 814 or the access device 812, one of ordinary skill in the art will recognize that the client devices of some embodiments may access the map service via multiple different wired and/or wireless protocols.

Devices 802a-802c can also establish communications by other means. For example, these devices may communicate with other wireless devices (e.g., other devices 802b, cell phones, etc.) over the wireless network 810 or through access device 812. Likewise the devices 802a-802c can establish peer-to-peer communications 840 (e.g., a personal area network) by use of one or more communication subsystems, such as Bluetooth® communication or similar peer-to-peer protocols.

Devices 802a-802c may also receive Global Positioning Satellite (GPS) signals from GPS satellites 860. In addition, in some embodiments the map service 830 and other services 850 may also receive GPS signals from GPS satellites 860.

A map service 830 may provide map services for one or more client devices 802a-802c in communication with the map service 830 through various communication methods and protocols. A map service 830 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 802a-802c may utilize these map services to obtain the various map service data, then implement various techniques to process the data and provide the processed data to various entities (e.g., internal software or hardware modules, display screens of the client devices, external display screens, or other external systems or devices.

The map service 830 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 802a-802c, the map service 830 of some embodiments, performs various optimization techniques to analyze a map tile before encoding the tile.

In some embodiments, the map tiles are generated by the map service 830 for different possible display resolutions at the client devices 802*a*-802*c*. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 830 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 830 responds to requests from the client devices 802*a*-802*c* for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 802*a*-802*c* that obtain map service data from the map service 830 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 802*a*-802*c* implements a navigation system (e.g., turn-by-turn navigation), which may be part of an integrated mapping and navigation application. A navigation system provides directions or route information, which may be displayed to a user. As mentioned above, a client device may receive both map image data and route data from the map service 830. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 802*a*-802*c* of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 830 and/or other service(s) 850 are configured to process search requests from any of the client devices. Search requests may include but are not limited to queries for businesses, addresses, residential locations, points of interest, or some combination thereof. Map service 830 and/or other service(s) 850 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 830 and/or other service(s) 850 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 830 and/or other service(s) 850, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 830 and/or other service(s) 850 provide one or more feedback mechanisms to receive feedback from client devices 802a-802c. For instance, client devices may provide feedback on search results to map service 830 and/or other service(s) 850 (e.g., feedback specifying ratings, reviews, temporary or permanent business closures, errors etc.); this feedback may be used to update information about points of interest in order to provide more accurate or more up-to-date search results in the future. In some embodiments, map service 830 and/or other service(s) 850 may provide testing information to the client device (e.g., an AB test) to determine which search results are best. For instance, at random intervals, the client device may receive and present two search results to a user and allow the user to indicate the best result. The client device may report the test results to map service 830 and/or other service(s) 850 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

We claim:

1. A method implemented using a server computing device, the server computing device executing a map service that is implemented by one or more processors and a memory device, the method comprising:
   generating, by the map service, a trip pattern from a list of stops included in transit schedule data for a transit line;
   generating, by the map service, structured curated data that includes two or more platforms for a stop included in the list of stops;
   based on the generated trip patterns, generating, by the map service, a particular trip-pattern stop for each stop of the trip pattern;
   identifying, by the map service, from the two or more platforms, a platform that corresponds to the particular trip-pattern stop;
   associating, by the map service, the platform with the particular trip-pattern stop in a merged data storage that merges a first subset of the structured curated data and a second subset of the transit schedule data; and
   in response to a navigation instructions request from a client device, causing, by the map service, the client device to present navigation instructions based on transit route data obtained from the merged data storage.

2. The method of claim 1, further comprising:
   receiving the transit schedule data from a transit authority, the transit data including data for one or more transit lines including the transit line;
   receiving structured curated data including the two or more platforms;
   generating one or more transit lines from the two or more platforms; and
   mapping the trip pattern to the transit line, the two or more platforms being identified at their physical locations by a curating team.

3. The method of claim 2, further comprising:
   performing cleansing and normalization operations on data regarding routes in the transit schedule data; and
   mapping the routes to transit lines.

4. The method of claim 2, further comprising using the trip patterns to align stops defined in the transit schedule data to platforms defined in the structured curated data.

5. The method of claim 4, wherein each trip pattern is an ordered sequence of stops that is taken during one or more trips by one or more transit passengers, wherein using the trip patterns comprises:
   defining particular trip stops for the transit stops associated with a trip pattern; and
   associating each trip stop with a platform.

6. The method of claim 1 further comprising:
   using the merged data storage to process a search query regarding at least one transit route or one transit location; and
   for at least one transit data tuple that is retrieved in response to the search query, retrieving at least one curated data tuple that is associated with the retrieved transit data tuple.

7. The method of claim 1 further comprising associating a plurality of stored transit data tuples with a plurality of stored curated data tuples.

8. The method of claim 1, wherein the transit schedule data has a first data size, the structured curated data has a second data size, further comprising:
   generating the trip patterns from the list of stops;
   storing the trip patterns as trip pattern data in the transit schedule data; and
   generating the merged data storage by combining trip pattern data from the transit schedule data and the structured curated data, wherein the merged data storage has a third data size that is smaller than a combination of the first data size and the second data size.

9. The method of claim 1, wherein the structured curated data includes data for one or more of hallways, station access points, and parking locations associated with each platform of the one or more platforms, further comprising:

receiving the navigation instructions request from the client device, wherein the navigation instructions request includes a source location and a destination location; and in response to the navigation instructions request, causing the client device to present navigation instructions that include data for one or more of a hallway, a station access point, and a parking location for one or more platforms associated with one or more of the source location and the destination location.

10. A system comprising:
a map service that is implemented by one or more processors; and
a non-transitory computer-readable medium including one or more sets of instructions that, when executed by the one or more processors, cause:
generating, by the map service, a trip pattern from a list of stops included in transit schedule data for a transit line;
generating, by the map service, structured curated data that includes two or more platforms for a stop included in the list of stops;
based on the generated trip patterns, generating, by the map service, a particular trip-pattern stop for each stop of the trip pattern;
identifying, by the map service, from the two or more platforms, a platform that corresponds to the particular trip-pattern stop;
associating, by the map service, the platform with the particular trip-pattern stop in a merged data storage that merges a first subset of the structured curated data and a second subset of the transit schedule data; and
in response to a navigation instructions request from a client device, causing, by the map service, the client device to present navigation instructions based on transit route data obtained from the merged data storage.

11. The system of claim 10, wherein the sets of instructions further cause:
receiving the transit schedule data from a transit authority, the transit data including data for one or more transit lines including the transit line;
receiving structured curated data including the two or more platforms;
generating one or more transit lines from the two or more platforms; and
mapping the trip pattern to the transit line, the two or more platforms being identified at their physical locations by a curating team.

12. The system of claim 11, wherein the sets of instructions further cause:
performing cleansing and normalization operations on data regarding routes in the transit schedule data; and
mapping the routes to transit lines.

13. The system of claim 10, wherein the sets of instructions further cause using the trip patterns to align stops defined in the transit schedule data to platforms defined in the structured curated data.

14. The system of claim 13, wherein each trip pattern is an ordered sequence of stops that is taken during one or more trips by one or more transit passengers, wherein using the trip patterns comprises:
defining particular trip stops for the transit stops associated with a trip pattern; and
associating each trip stop with a platform.

15. The system of claim 10 wherein the sets of instructions further cause:

using the merged data storage to process a search query regarding at least one transit route or one transit location; and
in response to the search query in which at least one transit data tuple is retrieved, retrieving at least one curated data tuple that is associated with the retrieved transit data tuple.

16. The system of claim 10 wherein the sets of instructions further cause associating a plurality of stored transit data tuples with a plurality of stored curated data tuples.

17. A non-transitory machine-readable medium storing a map service program comprising sets of instructions for:
generating, by the map service, a trip pattern from a list of stops included in transit schedule data for a transit line;
generating, by the map service, structured curated data that includes two or more platforms for a stop included in the list of stops;
based on the generated trip patterns, generating, by the map service, a particular trip-pattern stop for each stop of the trip pattern;
identifying, by the map service, from the two or more platforms, a platform that corresponds to the particular trip-pattern stop;
associating, by the map service, the platform with the particular trip-pattern stop in a merged data storage that merges a first subset of the structured curated data and a second subset of the transit schedule data; and
in response to a navigation instructions request from a client device, causing, by the map service, the client device to present navigation instructions based on transit route data obtained from the merged data storage.

18. The non-transitory machine-readable medium of claim 17, wherein the sets of instructions further comprise a set of instructions for:
receiving the transit schedule data from a transit authority, the transit data including data for one or more transit lines including the transit line;
receiving structured curated data including the list of two or more platforms;
generating one or more transit lines from the two or more platforms; and
mapping the trip pattern to the transit line, the two or more platforms being identified at their physical locations by a curating team.

19. The non-transitory machine-readable medium of claim 18, wherein the sets of instructions further comprise a set of instructions for:
performing cleansing and normalization operations on data regarding routes in the transit schedule data; and
mapping the routes to transit lines.

20. The non-transitory machine-readable medium of claim 17, wherein the sets of instructions comprise a set of instructions for using the trip patterns to align stops defined in the transit schedule data to platforms defined in the structured curated data.

21. The non-transitory machine-readable medium of claim 20, wherein each trip pattern is an ordered sequence of stops that is taken during one or more trips by one or more transit passengers, wherein using the trip patterns comprises sets of instructions for:
defining particular trip stops for the transit stops associated with a trip pattern; and
associating each trip stop with a platform.

22. The non-transitory machine-readable medium of claim 17, wherein the program further comprises sets of instructions for:
- using the merged data storage to process a search query regarding at least one transit route or one transit location; and
- for at least one transit data tuple that is retrieved in response to the search query, retrieving at least one curated data tuple that is associated with the retrieved transit data tuple.

\* \* \* \* \*